United States Patent
Berens et al.

(10) Patent No.: US 8,259,879 B2
(45) Date of Patent: Sep. 4, 2012

(54) METHOD FOR DETECTING THE EVENTUAL PRESENCE OF AN INTERFERER, FOR EXAMPLE A RADAR SIGNAL, ADAPTED TO INTERFERE WITH A WIRELESS DEVICE, FOR EXAMPLE AN UWB DEVICE, AND CORRESPONDING DEVICE

(75) Inventors: Friedbert Berens, Geneva (CH); Eric Achkar, Saint Julien en Genevois (FR)

(73) Assignee: STMicroelectronics N.V., Amsterdam (NL)

( * ) Notice: Subject to any disclaimer, the term of this patent is extended or adjusted under 35 U.S.C. 154(b) by 1052 days.

(21) Appl. No.: 12/145,610

(22) Filed: Jun. 25, 2008

(65) Prior Publication Data

US 2009/0036084 A1 Feb. 5, 2009

(30) Foreign Application Priority Data

Jul. 12, 2007 (EP) .................................. 07112322

(51) Int. Cl.
*H03D 1/04* (2006.01)
(52) U.S. Cl. ........ 375/346; 375/316; 375/348; 327/384; 327/310; 327/550; 455/296
(58) Field of Classification Search ............... 375/346
See application file for complete search history.

(56) References Cited

U.S. PATENT DOCUMENTS

| | | | | |
|---|---|---|---|---|
| 4,398,275 A * | 8/1983 | Zehner | ........................ | 367/137 |
| 5,017,921 A * | 5/1991 | McGill et al. | .................. | 342/18 |
| 5,084,669 A * | 1/1992 | Dent | .......................... | 324/76.82 |
| 5,830,064 A * | 11/1998 | Bradish et al. | .................. | 463/22 |
| 5,914,780 A * | 6/1999 | Turner et al. | .................... | 356/451 |
| 6,654,054 B1 * | 11/2003 | Embler | ........................ | 348/241 |
| 7,489,739 B2 * | 2/2009 | Dally | ............................ | 375/316 |
| 2002/0178020 A1 * | 11/2002 | Simon et al. | ...................... | 705/1 |
| 2003/0107512 A1 | 6/2003 | McFarland et al. | ........... | 342/159 |
| 2003/0156662 A1 * | 8/2003 | Engl et al. | ...................... | 375/340 |
| 2003/0206130 A1 | 11/2003 | Husted et al. | ................... | 342/57 |
| 2004/0048595 A1 * | 3/2004 | Miller et al. | .................. | 455/334 |
| 2004/0085143 A1 * | 5/2004 | Stoddard et al. | ............... | 331/74 |
| 2006/0028376 A1 | 2/2006 | Theobold et al. | ............ | 342/159 |
| 2006/0058035 A1 * | 3/2006 | Tsuruno | ....................... | 455/454 |
| 2006/0199587 A1 * | 9/2006 | Hansen | ......................... | 455/442 |
| 2008/0309535 A1 * | 12/2008 | Le Guillou | .................... | 341/143 |
| 2010/0177857 A1 * | 7/2010 | Huttunen et al. | ............. | 375/350 |

FOREIGN PATENT DOCUMENTS

| | | |
|---|---|---|
| EP | 0963051 | 12/1999 |
| EP | 1515488 | 3/2005 |
| WO | WO2004092763 | 10/2004 |

* cited by examiner

*Primary Examiner* — David Ometz
*Assistant Examiner* — Santiago Garcia
(74) *Attorney, Agent, or Firm* — Allen, Dyer, Doppelt, Milbrath & Gilchrist, P.A.

(57) ABSTRACT

The method is for detecting the eventual presence of an interferer that is adapted to interfere with a wireless device. The wireless device is provided with at least one receiving chain including an analog to digital conversion stage. The method includes receiving on the receiving chain an incident signal, and delivering to the ADC stage an analog signal from the incident signal. The method further includes elaborating or determining a binary information from a binary signal delivered by the ADC stage and representative of the level of the analog signal, analyzing a temporal evolution of the binary information and detecting the presence of the interferer from the analysis.

27 Claims, 7 Drawing Sheets

METHOD FOR DETECTING THE EVENTUAL PRESENCE OF AN INTERFERER, FOR EXAMPLE A RADAR SIGNAL, ADAPTED TO INTERFERE WITH A WIRELESS DEVICE, FOR EXAMPLE AN UWB DEVICE, AND CORRESPONDING DEVICE

FIELD OF THE INVENTION

The invention relates to wireless communication systems, and more particularly to the detection of interferences within different wireless communication devices, for example devices belonging to an UWB (Ultra Wide Band) communication system.

BACKGROUND OF THE INVENTION

The main characteristic of a UWB based wireless communication system is the fact that it operates as an underlying system in frequency bands already in use by other wireless communication and location (RADAR) systems. These incumbent systems will generate interference in the UWB systems (Inband interference) and the UWB system will generate interference towards these systems. Due to the very limited transmission power of the UWB systems, the range in which the generated interference will cause a degradation in the incumbent system is limited to a few meters or less, e.g. a $10^{th}$ of a meter. In case of radar systems, this range can be up to 5000 meters in the direction of the main beam with line-of-sight conditions. An incumbent system operating in this area will also generate interference towards the UWB system in operation and thus leads to a degradation of the communication performance.

Currently, radar detection is performed based on the rotation frequency of the radar antenna and the received pulse trains. For that, it is necessary to detect at least three pulse trains. It thus may take at least 15 seconds to identify the radar.

SUMMARY OF THE INVENTION

According to an embodiment, a method and a wireless device are provided that can identity and classify interferer signals, in particular radar signals in a very fast manner and by using existing components.

According to an aspect, a method is provided for detecting the eventual presence of an interferer adapted to interfere with a wireless device, the wireless device being provided with at least one receiving chain including an analog to digital conversion (ADC) stage. The method includes receiving on the receiving chain an incident signal, delivering to the ADC stage an analog signal from the incident signal, and elaborating or determining binary information from a binary signal delivered by the ADC stage and representative of the level of the analog signal. The method further includes analyzing a temporal evolution of the binary information and detecting the eventual presence of the interferer from the analysis.

According to an embodiment, the ADC stage delivers an overflow signal at the sampling frequency, and the binary signal is such overflow signal. However, other possibilities exist for the binary signal. For example, the ADC stage delivers at the sampling frequency a digital signal corresponding to the analog signal and defining a digital word and the binary signal is the binary signal carrying the Most Significant Bit (MSB) of the digital word.

When the ADC stage performs the analog-to-digital conversion at a sampling frequency, the binary signal is delivered at the sampling frequency and the binary information may be the binary signal.

However according to another variant, determining the binary information may comprise down-sampling the binary signal and the binary information is the down-sampled binary signal.

According to an embodiment, the binary information is adapted to have a first value and a second value, and analyzing a temporal evolution of the binary information comprises detecting the occurrences of the first value and determining an analysis information representative of a temporal evolution of the occurrences. The detecting step may comprise comparing the analysis information with a reference information representative of the interferer.

For example, determining the analysis information may comprise counting the amount of successive first values and determining the occurrence frequency of successive packets including successive first values. For example, the first value is a logical value representative of an overflow of the ADC stage or a logical value equal to 1 for the Most Significant Bit.

The interferer may be a radar signal. In such a case, the reference information may be a radar signature including a pulse direction and a pulse repetition frequency. However, the interferer may also be a high power victim receiver or device, for example a WIMAX device.

To detect weaker interferer signals, it is possible to increase the gain of the front end stage and take into account the gain of the front end stage in the calculation of the received power level. Although it is possible to sample the analog signal at a high sampling frequency, it is advantageous to perform a frequency transposition of the incident signal in a base frequency band in order to reduce the sampling frequency.

According to another aspect, a wireless device is provided and includes at least one receiving chain adapted to receive an incident signal and to deliver an analog signal, and an analog to digital conversion (ADC) stage adapted to receive the analog signal and to deliver a binary signal representative of the level of the analog signal. A first unit or means is adapted to elaborate or determine binary information from the binary signal, a second unit or means is adapted to analyze a temporal evolution of the binary information, and a third unit or means is adapted to detect the eventual presence of an interferer from the analysis.

According to an embodiment, the ADC stage is adapted to perform an analog to digital conversion at a sampling frequency, and to deliver the binary signal at the sampling frequency and the binary information is the binary signal.

According to an embodiment, the ADC stage is adapted to perform an analog to digital conversion at a sampling frequency and to deliver the binary signal at the sampling frequency and the first means comprises down-sampling means adapted to down-sample the binary signal, the binary information being the down-sampled binary signal.

According to an embodiment, the binary information is adapted to have a first value and a second value and the second means comprises a detection unit or means adapted to detect the occurrences of the first value and an elaboration unit or means adapted to elaborate an analysis information representative of a temporal evolution of the occurrences. The third means may comprise a memory or means adapted to store a reference information representative of the interferer and a comparator or comparison means adapted to compare the analysis information with the reference information.

According to an embodiment, the elaboration means may comprise a counter for counting the amount of successive first values and calculation means for determining the occurrence frequency of successive packets including successive first values.

BRIEF DESCRIPTION OF THE DRAWINGS

Other advantages and features of the invention will appear on examining the detailed description of embodiments, these being in no way limiting, and of the appended drawings in which.

DETAILED DESCRIPTION OF THE PREFERRED EMBODIMENTS

Figure 1:
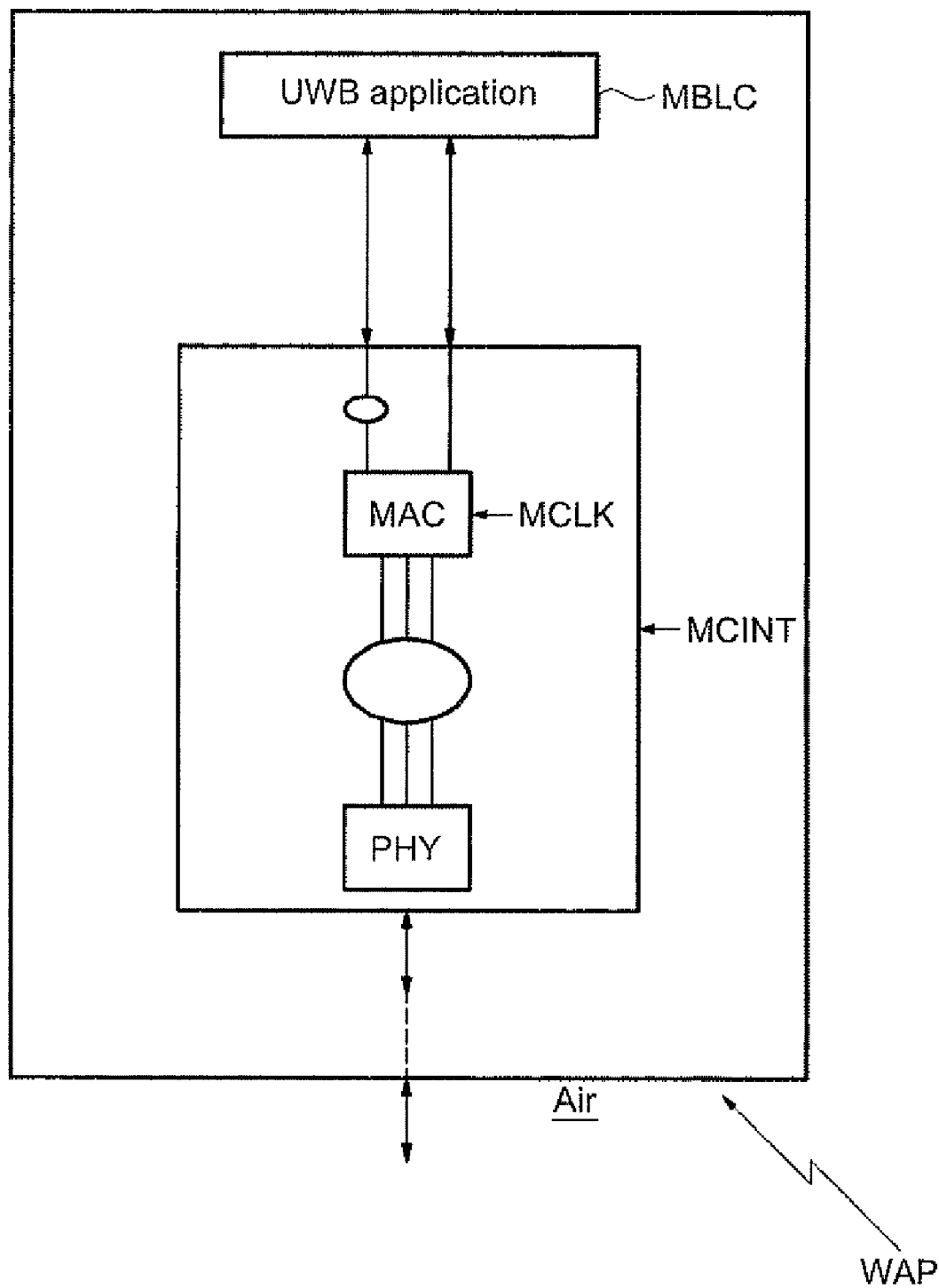
FIG. 1 is a schematic diagram illustrating an embodiment of a UWB device.

FIG. 1 discloses an example of a wireless communication device WAP belonging to a non-coordinated communication system such as a WLAN ("Wireless Local Area Network") or a WPAN ("Wireless Personal Area Network"). Such a wireless device WAP belongs for example to an OFDM based Ultra Wide Band Communication system. However, the invention is not limited to such an example and can apply also for example to coordinated wireless systems like mobile radio systems and more generally to any kind of wireless systems as for example CDMA, GSM systems or generalized multi-carrier (GMC) systems in which the carriers are not necessarily orthogonal.

WPAN MAC (medium access control) protocols have a distributed nature where there is no central coordinator terminal or base station to assign the medium access. There, in contrast to a mobile radio terminal, a WPAN transceiver has much higher flexibility to allocate the transmission slot and formats. The allocation of the communication resources is a distributed process. The allocation to a specific time slot in the super frame can be modified from one superframe to the next. The controlling entity is the WPAN-MAC layer of the communicating terminals. The allocation is based on the requested data rate and the type of service to be transmitted. Furthermore, the available resources are taken into account in the allocation process. The MAC layer requests a reservation for a specific time slot or a number of time slots based on these constraints. These constraints can be split into local constraints, like the data rate to be transmitted or received and network wide constraints like the already existing slot reservation.

An example of a distributed WPAN-MAC is a MBOA (Multi-Band OFDM Alliance) MAC. The proposed MBOA MAC standard draft is based on a UWB technology and is planned to be used in the frequency band between 3.1 and 10.7 GHz. First implementations using the standard work in the frequency range between 3.1 GHz and 5.0 GHz.

The wireless device WAP includes, conventionally, an OFDM based UWB communication interface MCINT connected between a UWB application block MBLC and the air channel. This communication interface comprises an UWB MAC layer clocked by a clock signal MCLK and connected to a PHY layer and to the UWB application block. For further details concerning the MAC layer and the PHY layer of the communication interface, the skilled artisan may refer to the High Rate Ultra Wideband PHY and MAC Standard, Standard ECMA-368, $1^{st}$ edition, December 2005, and to the MAC-PHY Interface for ECMA-368, Standard ECMA-369, $1^{st}$ edition, December 2005.

The MAC layer manages in particular the emission/reception of the UWB data stream and is incorporated by software in a control processor BB. A band of frequencies used for the operation (transmission and/or reception) of the device WAP lies between 3.1 GHz and 4.9 GHz, for example. Further, the frequency band is subdivided into three sub-bands called hopping sub-bands, which are mutually spaced. More precisely, there is a guard interval of 100 MHz between the lower limit (3.1 GHz) of the main frequency band and the beginning of the first sub-band as well as between the end of the third sub-band and the upper limit (4.9 GHz) of the main frequency band. Further, two adjacent sub-bands are spaced by a guard interval of 50 MHz. The allocation of the sub-bands during the transmission is made according to a predetermined hopping sequence.

Figure 2:
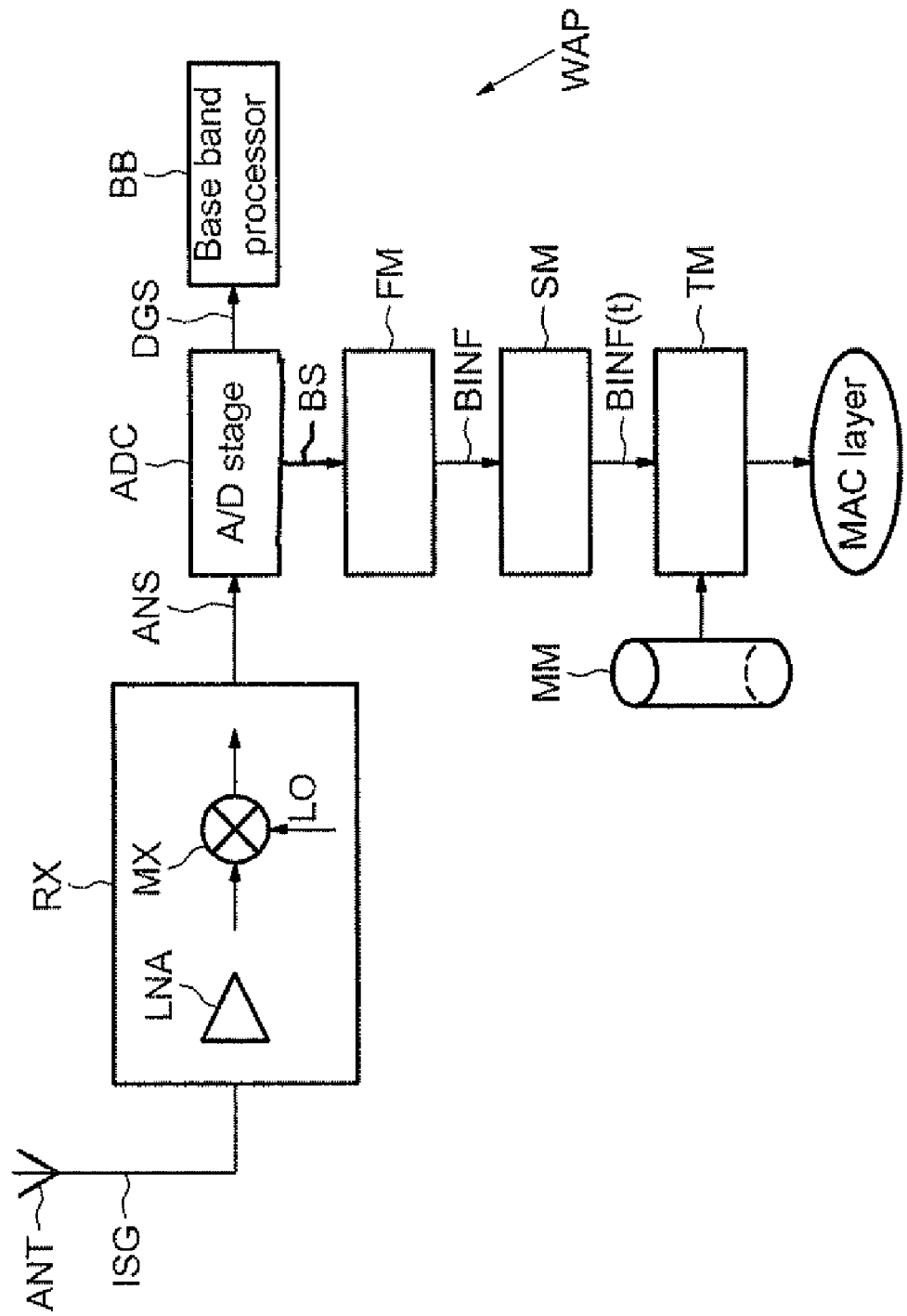
FIG. 2 is a schematic diagram illustrating in further detail an embodiment of a wireless device allowing an interferer detection.

Referring now to FIG. 2, the wireless device WAP comprises an antenna ANT adapted to receive an incident UWB signal ISG. A receiving chain RX is connected to the antenna signal and comprises in this example in particular, a low noise amplifier LNA as well as a mixer MX to perform a frequency transposition in the frequency base band using a transposition signal LO provided by a Phase-Locked loop for example. The frequency value of the signal LO depends on the operation sub-band of the device WAP.

Figure 3:
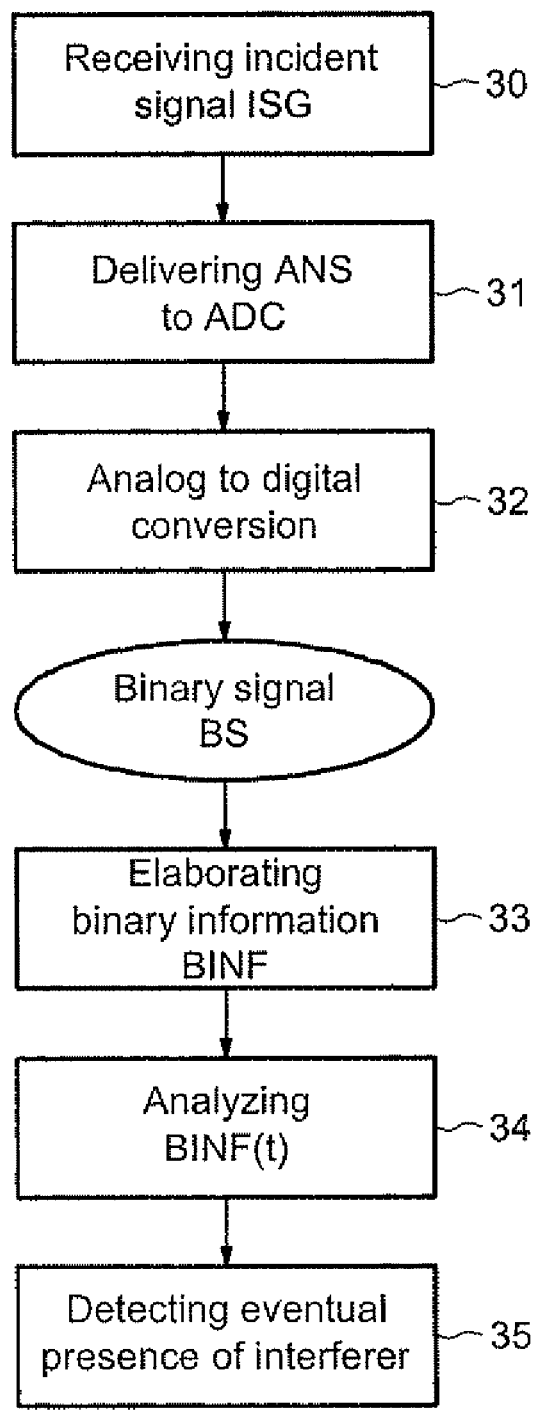
FIG. 3 is a flowchart illustrating an embodiment of a method for detecting an interferer signal.
Figure 4:
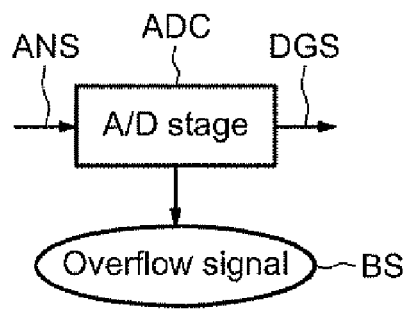
FIGS. 4-7 are schematic diagrams illustrating various details of an embodiment of a method and a wireless device allowing detection of a radar interferer.

The analog signal ANS delivered by the receiving chain is delivered to the input of an analog-to-digital stage ADC which converts the analog signal ANS into a digital signal DGS. The frequency transposition is not mandatory but leads to a lower sampling frequency of the ADC. The digital signal DGS is delivered to the Base Band Processor BB. As can be seen in FIG. 3, the steps of receiving the incident signal ISG, delivering the analog signal ANS to the ADC stage and performing the analog-to-digital conversion, are respectively referenced 30, 31 and 32.

The ADC stage delivers a binary signal BS from which a binary information BINF is elaborated or determined (step 33). Then, the temporal evolution BINF (t) of the binary information BINF is analyzed (step 34) and the result of this analysis permits detection of the eventual presence of an interferer (step 35), for example a radar signal.

Now, an embodiment of the invention will be described, assuming that an interferer is a radar signal, although the invention is not limited to this particular type of interferer. The signal characteristics of radar signals are special. Indeed, radars normally use a very high power pulse of a duration $\tau_{pulse} > 1$ μs, with a pulse repetition frequency of 20 Hz to 1500 Hz. The EIRP (Equivalent Isotropically Radiated Power) TX (transmission) power is in the range of 100 dBm or higher. Due to the motion of the radar antenna with a rotation rate of around 12 rotations/min with a beam opening angle of around 1.7°, a pulse train with several pulses is transmitted every 5 s in a given direction. The duration of this pulse train is in the range of 25 ms. Since a UWB system also operates in the same frequency bands where radar systems operate too (3.1 GHz to 3.4 GHz, 8.5 GHz to 9.0 GHz), the UWB device needs to determine if a radar is in near vicinity (with a range up to 5000 meters), to avoid UWB operation during the RX time (25 ms) of the radar. The rest of the time the UWB device can operate without restrictions. Taking into account the TX power of the Radar of 100 dBm and a distance of 5000 meters, the power received in the UWB device is in the range of at least −20 dBm. This power is much too high for a UWB receiver and therefore will saturate it.

This can be evaluated by the overflow/saturation signal BS, which is delivered by the ADC converter of the UWB receiver WAP. Based on the temporal evolution of this overflow signal, it will be possible to identify and classify radar signals in a very fast manner.

Figure 6:
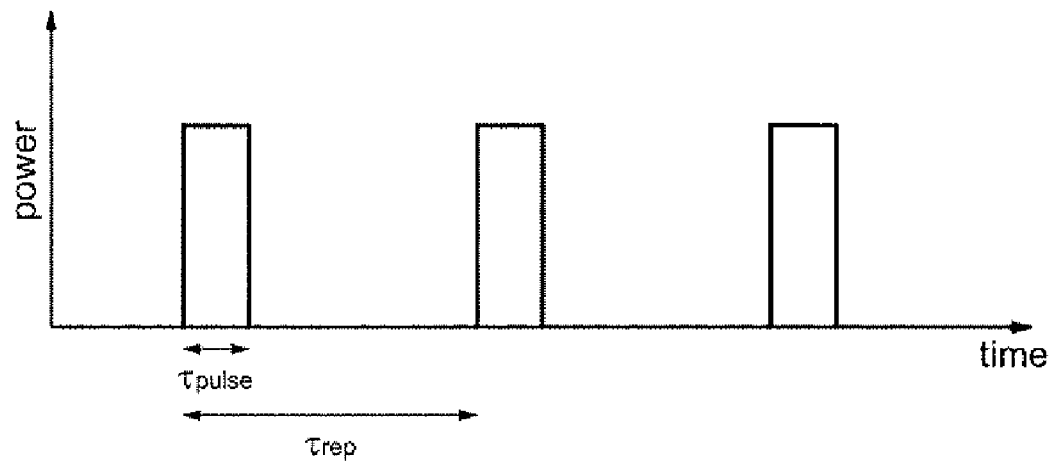

In FIG. 6 a typical pulse repetition sequence of a radar signal is depicted. The values for $\tau_{pulse}$ are in the range between 300 ns to 1600 µs, the values for $\tau_{rep}$ (repetition period) are in the range between 100 µs and 1 ms. The TX power is in the range of 100 dBm or above. The UWB transceiver identifies these pulses in analyzing the pulse duration, and the pulse repetition frequency via the ADC in the UWB receiver.

The different radar types have different protection levels and also different time patterns for the pulses. Thus, by identifying the pattern the different radar types can be recognized. Therefore, the UWB device can react accordingly by avoiding the frequency bands in use during the sensitive time of the radar RX.

To protect radars efficiently (Safety of life application), the UWB device needs preferably to detect the radar before the UWB device starts transmitting. Thus during start-up of the device the UWB will have to scan for radar in the planned operation band. In the present case, this scanning is done as follows.

Figure 5:
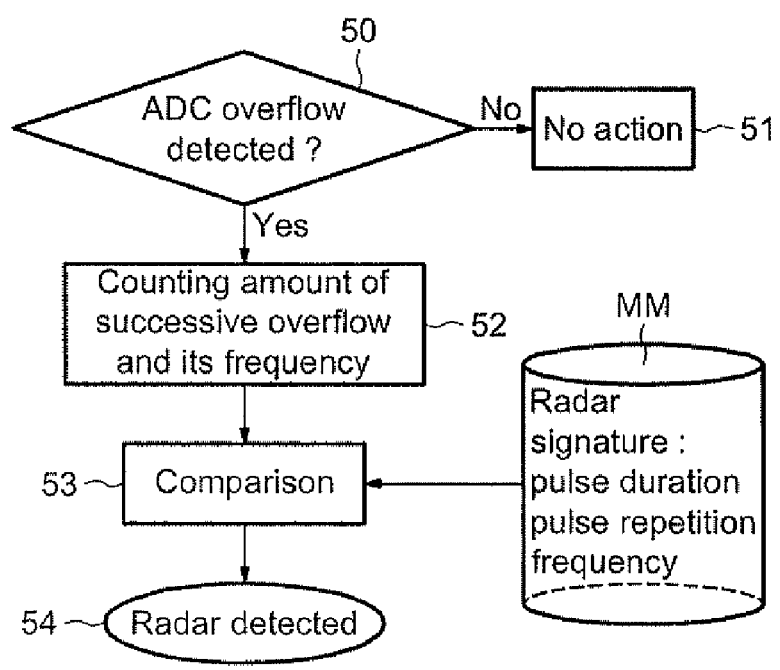

The receiver WAP is switched on, and if a variable gain amplifier is provided, preferably set this variable gain amplifier to the lowest level to obtain the lowest sensitivity of the receiver. The saturation events/overflow events are evaluated at the output of the ADC during at least the longest possible radar rotation time, e.g. 5 seconds, and the result is compared with a stored radar signature data base containing the pulse duration and the pulse repetition of frequencies. This database is stored in a memory or memory means MM. If radar signature is detected, the MAC layer is informed to avoid the radar; if no radar is detected, start up is performed without radar avoidance. The radar detection procedure is repeated during operational time every X seconds, (X is for example in the range of 3000 seconds), and if a radar is detected, rotation of frequency is identified using the ADC overflow information, and the timing of the rotation is transferred to the MAC layer for time sharing operation. This procedure is summarized in FIG. 5.

More precisely, if an ADC overflow is detected (step 50), for example if the overflow signal is equal to 1, then step 52 is performed. On the contrary, if ADC overflow signal is equal to zero, no action is performed (step 51). Then, the temporal evolution of the binary signal BS (here the overflow signal) is performed in step 52 by counting the amount of successive overflows and its frequency. In this example, the binary information BINF is the binary signal BS.

Figure 7:
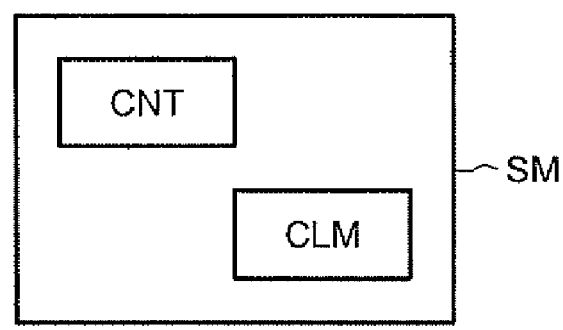

A comparison is performed (step 53) with a radar signature to detect the eventual presence of a radar signal (step 54). On a hardware point of view, the second unit or means SM, which analyses the temporal evolution of the binary signal BS (overflow signal) comprises counting means CNT (FIG. 7) as well as calculation means for calculating the pulse duration and the pulse repetition frequency.

In the present example, the down-converted signal ANS which is transferred to the ADC converter is converted into the digital signal DGS at a sampling rate, for example by using a clock having a frequency equal to 1 GHz. Thus, the ADC converter delivers the digital output signal DGS with a rate of 1 Gsample/s. The overflow signal BS is also delivered with the same rate of 1 Gsample/s. Thus, the basic resolution is in this case equal to 1 nanosecond.

The overflow signal is fed into a counter which counts the number of overflows and the period of the overflows. To identify a radar pulse more than one overflow needs to occur consecutively. For a pulse duration of $\tau_{pulse}$ 1000 ns, 1000 successive overflows will occur. The identified pulse duration and the PRF (Pulse Repetition Frequency) are provided to an evaluation unit of the third means TM which classifies the received information by using a radar signature data base. This information is then transferred to the UWB MAC layer to take the needed radar protection actions.

The evaluation entity further controls the counter entity to measure the rotation frequency of the detected radar system. This information can then be used by the MAC layer or higher layers for a protection strategy based on time sharing. If no radar signature is detected the detection process needs to be performed from time to time to make sure that the UWB device is not being moved into the mitigation range of a radar.

Figure 8:
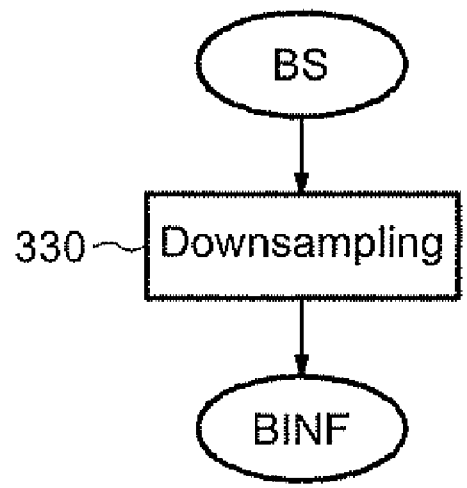
FIGS. 8-10 are schematic diagrams illustrating other possible embodiments of a method and a wireless device allowing interferer detection.
Figure 9:
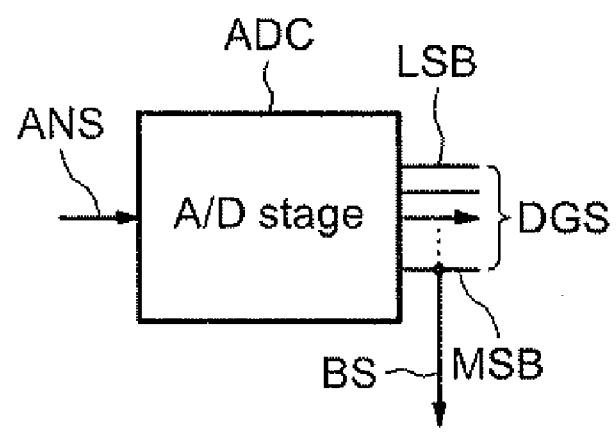

In the preceding example, the overflow/saturation signal BS which is in the present case the binary information BINF is used directly from the ADC converter with sampling rate of 1 Gsample/s. This rate is not needed for the precise identification of the radar pulse duration. To save power the overflow signal can be downsampled by a factor of n, n being an integer in the range of 10 to 1000 depending on the radar to be detected. In other words, as illustrated in FIG. 8, after the binary signal BS is down-sampled (step 330), the binary information BINF is the down-sampled binary signal BS.

With the above described embodiments, identifying a radar takes about 5 seconds, while it takes at least 15 seconds with a conventional method. The invention is not limited to the above described examples and permits easy detection in a very fast manner of all types of interferers, including, for example, a WIMAX device.

A WIMAX device operates for example with a bandwidth of 20 MHz at a central frequency of 3.5 GHz. The symbol duration may be around 100 µs. The frame structure of a WIMAX signal is given for example in the document "Scalable OFDMA Physical Layer in IEEE 802.16 WirelessMAN", Intel Technology Journal, Volume 08, Issue 03, published Aug. 20, 2004, ISSN 1535-864X. It has also to be noted that the WIMAX standard is not a single definition of one system but rather a collection of building blocks. Thus, the exact parameters might vary.

Figure 10:
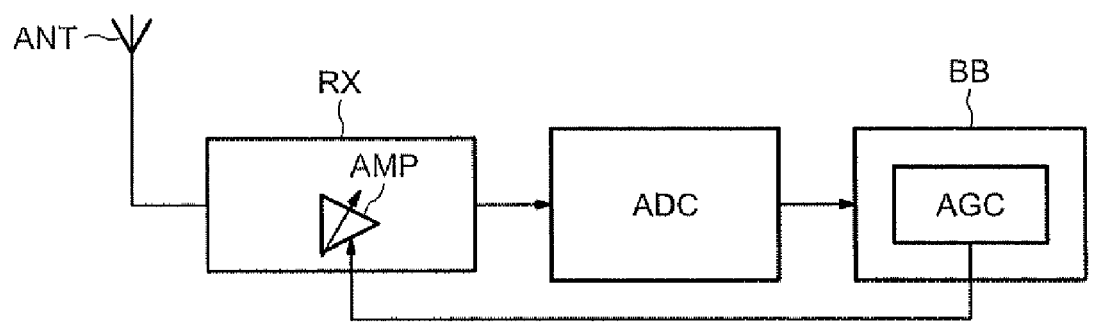

The invention permits also, in other cases, to detect other high power victim systems, for example, with separation distances bellow three meters. It is also possible to detect weaker interferer signals, for example by increasing the gain of the variable gain amplifier AMP (FIG. 10), which is located within the receiving chain RX. In such a case, automatic gain control means AGC located within the Base Band Processor BB may be used to control the gain of the amplifier AMP.

The binary signal BS is not limited to the overflow/saturation signal delivered by the ADC converter. This binary signal may also be the most significant bit MSB of the digital signal DGS delivered by the ADC converter. By using the MSB, instead of the saturation/overflow signal, it is also possible to detect weaker interferer signals. For example, a MSB equal to 1 could be an indication of the presence of an interferer signal.

That which is claimed is:

1. A method for detecting the presence of an interferer capable of interference with a wireless device, the wireless device including at least one receiving chain and an associated analog to digital conversion (ADC) stage, the method comprising:

receiving an incident signal on the receiving chain;
delivering to the ADC stage an analog signal generated from the incident signal and providing a binary signal representative of the level of the analog signal;
determining binary information from the binary signal provided by the ADC stage, the binary information including a first value and a second value; and
analyzing a temporal evolution of the binary information to detect the presence of the interferer and comprising detecting the occurrences of the first value and generating an analysis information representative of a temporal evolution of the occurrences, and comparing the analysis information with reference information representative of the interferer;
wherein generating the analysis information comprises counting the amount of successive first values and determining an occurrence frequency of successive packets including successive first values.

2. The method according to claim 1, wherein the ADC stage performs the analog to digital conversion at a sampling frequency, and the binary signal is provided at the sampling frequency.

3. The method according to claim 1, wherein the ADC stage performs the analog to digital conversion at a sampling frequency, the binary signal is provided at the sampling frequency, and determining the binary information comprises down-sampling the binary signal.

4. The method according to claim 2, wherein the ADC stage delivers at the sampling frequency a digital signal corresponding to the analog signal and defining a digital word; and wherein the binary signal comprises the digital signal including a Most Significant Bit (MSB) of the digital word.

5. The method according to claim 2, wherein the ADC stage delivers at the sampling frequency an overflow signal defined by the binary signal.

6. The method according to claim 1, wherein the first value comprises at least one of a logical value representative of an overflow of the ADC stage and a logical value equal to 1 for a Most Significant Bit (MSB).

7. The method according to claim 1, wherein the interferer is defined by a radar signal; and wherein the reference information is a radar signature including a pulse duration and a pulse repetition frequency.

8. The method according to claim 1, wherein the interferer is defined by a radar signal.

9. The method according to claim 1, wherein the interferer comprises a WIMAX (Worldwide Interoperability for Microwave Access) device.

10. The method according to claim 1, wherein the at least one receiving chain includes a variable gain amplifier upstream from the ADC stage; and wherein delivering the analog signal further comprises increasing a gain of the variable gain amplifier.

11. The method according to claim 1, wherein delivering the analog signal comprises performing a frequency transposition of the incident signal in a base frequency band.

12. The method according to claim 1, wherein the incident signal comprises a UWB (Ultra Wide Band) signal.

13. A method for detecting the presence of an interferer capable of interference with a wireless device, the wireless device including an analog to digital conversion (ADC) stage, the method comprising:
receiving an incident signal;
delivering to the ADC stage an analog signal generated from the incident signal and providing a binary signal representative of the level of the analog signal;
determining binary information from the binary signal provided by the ADC stage, the binary information including a first value and a second value; and
analyzing the binary information to detect the presence of the interferer and comprising detecting the occurrences of the first value and generating an analysis information representative of a temporal evolution of the occurrences, and comparing the analysis information with reference information representative of the interferer;
wherein generating the analysis information comprises counting the amount of successive first values and determining an occurrence frequency of successive packets including successive first values.

14. The method according to claim 13, wherein the ADC stage performs the analog to digital conversion at a sampling frequency, and the binary signal is provided at the sampling frequency.

15. The method according to claim 14, wherein the ADC stage delivers at the sampling frequency an overflow signal defined by the binary signal.

16. A wireless device comprising:
at least one receiving chain to receive an incident signal and to deliver an analog signal;
an analog to digital conversion (ADC) stage to receive the analog signal and to deliver a binary signal representative of a level of the analog signal;
a first unit to determine binary information from the binary signal, the binary information including a first value and a second value;
a second unit to analyze a temporal evolution of the binary information and comprising a detection unit to detect the occurrences of the first value and an elaboration unit to generate an analysis information representative of a temporal evolution of the occurrences; and
a third unit to detect the presence of an interferer from the analysis and comprising a memory to store reference information representative of the interferer, and a comparison unit to compare the analysis information with the reference information;
wherein the elaboration unit comprises a counter for counting the amount of successive first values and calculation unit to determine an occurrence frequency of successive packets including successive first values.

17. The wireless device according to claim 16, wherein the ADC stage performs an analog to digital conversion at a sampling frequency, the first unit delivering the binary signal at the sampling frequency.

18. The wireless device according to claim 16, wherein the ADC stage performs an analog to digital conversion at a sampling frequency, the first unit delivering the binary signal at the sampling frequency and comprising a down-sampling unit to down-sample the binary signal, the binary information being defined by the down-sampled binary signal.

19. The wireless device according to claim 18, wherein the ADC stage delivers at the sampling frequency a digital signal corresponding to the analog signal and defining a digital word; and wherein the binary signal comprises the digital signal including the Most Significant Bit (MSB) of the digital word.

20. The wireless device according to claim 17, wherein the ADC stage delivers at the sampling frequency an overflow signal defined by the binary signal.

21. The wireless device according to claim 16, wherein the first value comprises at least one of a logical value representative of an overflow of the ADC stage and a logical value equal to 1 for a Most Significant Bit (MSB).

22. The wireless device according to claim 16, wherein the third unit detects the presence of a radar signal; and wherein the reference information comprises a radar signature including a pulse duration and a pulse repetition frequency.

23. The wireless device according to claim 16, wherein the third unit detects the presence of a radar signal.

24. The wireless device according to claim 16, wherein the third unit detects the presence of a WIMAX device.

25. The wireless device according to claim 16, wherein the receiving chain comprises an automatic gain control unit.

26. The wireless device according to claim 16, wherein the receiving chain comprises a transposition unit to perform a frequency transposition of the incident signal in a base frequency band.

27. The wireless device according to claim 16, wherein the incident signal comprises a UWB (Ultra Wide Band) signal and the device operates in a UWB communication system.

* * * * *